Dec. 17, 1957  R. KLOSS  2,816,530
INTERNAL COMBUSTION ENGINE
Filed June 1, 1956  3 Sheets-Sheet 1

INVENTOR
Richard Kloss
By
Patent Agent.

Dec. 17, 1957  R. KLOSS  2,816,530
INTERNAL COMBUSTION ENGINE
Filed June 1, 1956  3 Sheets-Sheet 2

INVENTOR
Richard Kloss

Dec. 17, 1957  R. KLOSS  2,816,530
INTERNAL COMBUSTION ENGINE
Filed June 1, 1956  3 Sheets-Sheet 3

INVENTOR
Richard Kloss
By
Patent Agent.

United States Patent Office 2,816,530
Patented Dec. 17, 1957

2,816,530
INTERNAL COMBUSTION ENGINE

Richard Kloss, Koln-Buchforst, Germany, assignor to Klöckner-Humboldt-Deutz Aktiengesellschaft, Koln, Germany Application June 1, 1956, Serial No. 588,880

Claims priority, application Germany June 4, 1955

6 Claims. (Cl. 123—41.85)

The present invention relates to internal combustion engines and is of particular advantage in connection with supercharged internal combustion engines.

With a supercharged internal combustion engine, the supercharge is stored under tension in the charging conduit when the inlet for the supercharging air is closed. When the engine following its start has been heated up to its normal heat of operation, it will be clear that during the period the inlet opening for the supercharged air is closed, the air charge will heat up. This heating up is strongest in the neighborhood of the closing members for the inlet opening. If the closing member is represented by an inlet valve, the valve head and the adjacent conduit walls strongly heat up the air charge. The heating up of the air charge results in a reduction of the intake charge or intake volume of air. Thus, the advantage to be obtained by the supercharged air is in part offset by the heating up of the supercharging air.

It is, therefore, an object of the present invention to provide an arrangement which will overcome the above mentioned drawbacks.

It is another object of this invention to provide a supercharged internal combustion engine, in which practically no heating up of the supercharging air will occur during the time periods during which the inlet opening leading to the cylinder is closed.

These and other objects and advantages of the invention will appear more clearly from the following specification in connection with the accompanying drawing in which.

General arrangement

According to the present invention the inlet conduit for conveying the air through the inlet opening of the cylinder head into the cylinder is provided with a blow-off aperture preferably shortly ahead of the said inlet opening. By the provision of such a blow-off aperture, for all practical purposes, no stagnation or undue accumulation or damming-up of the air, especially supercharging air, can occur inasmuch as the air is in a continuous flow and is being blown off through said blow-off aperture. Consequently, cool air will be available for charging the cylinder when the air inlet to the cylinder opens.

If the inlet opening is controlled by an inlet valve, a tube may be inserted into the blow-off opening in such a way that the inner end of the tube is arranged in close proximity to the valve head when the latter occupies its closing position. By such an arrangement, the air being blown off must sweep over the upper side of the valve head thereby advantageously cooling off the valve head.

Structural arrangement

Figure 1:
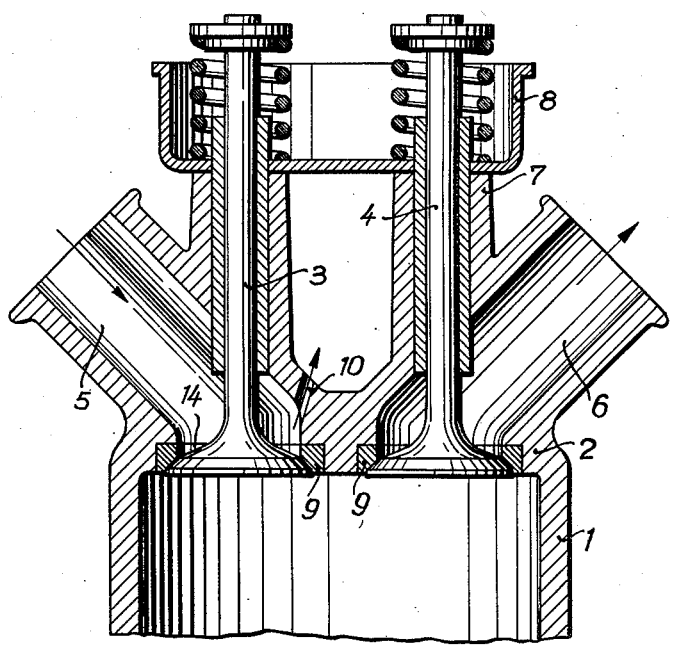
Fig. 1 is a diagrammatic vertical section through a cylinder head and the upper part of the cylinder of an internal combustion engine showing the arrangement of the present invention.

Referring now to the drawing in detail and Fig. 1 thereof in particular, this figure shows the cylinder 1 with the cylinder head 2 of a diesel engine. The cylinder head 2 is provided with an inlet valve 3 and an outlet valve 4. The inlet conduit leading to the inlet valve 3 is designated with the reference numeral 5, whereas the outlet conduit controlled by the outlet valve 4 is designated with the reference numeral 6. The valve guides 7 support a pan 8 which in customary manner is normally closed by a lid (not shown in the drawing) and in which are arranged the rocker arms (likewise not shown) for actuating the valves. The cooling system for the engine is not illustrated inasmuch as it does not form a part of the invention and inasmuch as the present invention is applicable for water cooled as well as for air cooled engines. The valve seats for the valves 3 and 4 are formed by rings 9 inserted into the cylinder head.

According to the present invention, the inlet conduit 5 is provided with a blow-off passage or channel 10 which is arranged in the neighborhood of the inlet opening 14 controlled by the inlet valve 3.

Figure 2:
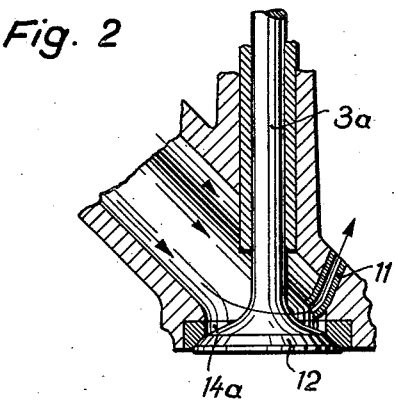
Fig. 2 illustrates a slight modification of a portion of Fig. 1.

The modification shown in Fig. 2 differs from that of Fig. 1 in that a pipe 11 is inserted into the blow-off passage as will be clearly evident from Fig. 2. The inner end of the pipe 11 ends shortly above the valve head 12 of the inlet valve 3a which governs the air inlet opening 14a. In this way, the air is forced to sweep over the top surface of the valve head 12 when the latter is in its closing position, thereby effectively cooling the valve head.

Figure 3:
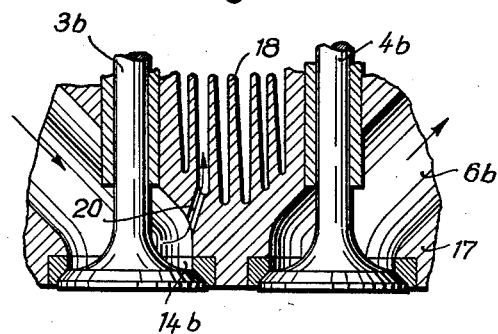
Fig. 3 is a diagrammatic vertical section through a portion of an air-cooled cylinder head provided with a blow-off passage according to the invention.

With an air cooled engine, the blow-off passage or channel 10 according to the invention will have its discharge on the outside between the cooling fins as shown by way of example in Fig. 3. More specifically, the cylinder head 17 of Fig. 3 differs from the cylinder head of Fig. 1 primarily in that it is provided with cooling fins 18 and that the blow-off passage or channel 20 extends from the inlet conduit 5b to a point between the cooling fins 18. All other parts of Fig. 3 which correspond to those of Fig. 1 have been designated with the same reference numeral as in Fig. 1 but with the additional character b.

Figure 4:
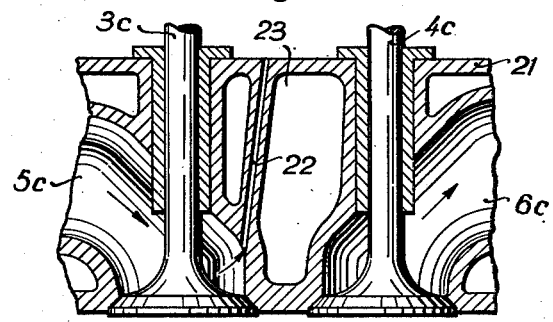
Fig. 4 illustrates the invention in a manner similar to Fig. 3, but for a water cooled cylinder head.

With a water cooled cylinder head 21 as shown in Fig. 4, the blow-off passage or channel 22 may extend through the cooling water jacket 23. All other parts of Fig. 4 which correspond to those of Fig. 1 have been designated with the same reference numerals as in Fig. 1 but with the additional character c.

Figure 5:
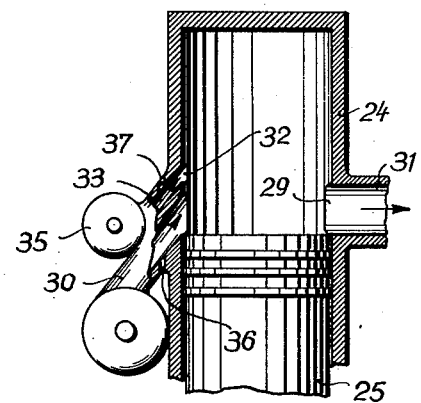
Figs. 5 and 6 show the invention in connection with the scavenging air conduit of two-stroke cycle engines.

While Figs. 1 to 4 illustrate the present invention in connection with a four-stroke cycle internal combustion engine, it is to be understood that the invention is, by no means, limited thereto. The invention may equally well be used in connection with two-stroke cycle internal combustion engines as will be evident from Figs. 5 and 6. Fig. 5 illustrates a portion of a slot controlled two-stroke cycle internal combustion engine comprising a cylinder 24 having reciprocably mounted therein a piston 25. The cylinder wall is provided with inlet slots 26 and outlet slots 29 (one inlet and outlet slot only being shown). Connected to the inlet slots 26 and outlet slots 27 are inlet conduits 30 and outlet conduits 31 respectively. The two-stroke cycle engine of Fig. 4 is an engine having auxiliary scavenging ports 32 (one only being shown) located above the inlet slots 26. Auxiliary conduits 33 are connected to the auxiliary ports 32. As will be evident from Fig. 5, the scavenging conduit 30 communicates with a scavenging air blower 34, while simultaneously the auxiliary port 32 through conduit 33 communicates with an auxiliary blower 35. In conformity with the invention, a blow-off passage 36 leads from the conduit 30 toward the outside while a blow-off passage 37 leads from the conduit 33 toward the outside. In some instances it will suffice if a blow-off passage is provided in either the conduit 30 or the conduit 33.

Figure 6:
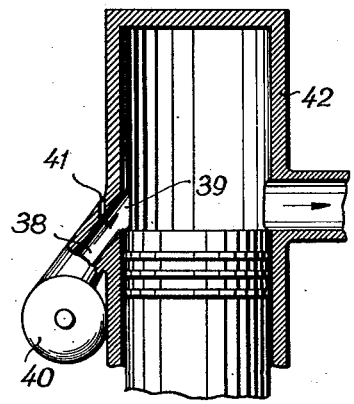

The two-stroke cycle engine according to Fig. 6 differs from that of Fig. 5 merely in that it has no auxiliary scavenging port and no auxiliary scavenging blower. The cylinder 42 of the engine according to Fig. 6 is merely provided with a scavenging conduit 38 leading to the scavenging slots 39 (one only being shown), while a scavenging blower 40 communicates with the conduit 38. A blow-off passage 41 leads from the conduit 38 toward the outside.

It is to be understood that the present invention is, by no means, limited to the particular arrangements and constructions shown in the drawing, but also comprises any modifications within the scope of the appended claims.

What I claim is:

1. In an internal combustion engine: a cylinder provided with an air inlet opening, air conveying conduit means leading to said air inlet opening for conveying air through the same into said cylinder, control means for closing and opening said inlet opening to control the admittance of air into said cylinder, and air by-pass means leading from said air conveying conduit means near said inlet opening toward the outside of said cylinder to by-pass a portion of the air in said conduit means toward the outside thereof whereby a stagnation of the air in front of said inlet opening is avoided.

2. In an internal combustion engine: a cylinder, a cylinder head connected to said cylinder and provided with an air intake conduit and also provided with a valve passage for conveying air from said air intake conduit through said valve passage into said cylinder, a control member for closing and opening said valve passage to control the admittance of air into said cylinder through said valve passage, and air by-pass means leading from said air conveying conduit near said valve passage toward the outside of said cylinder head to by-pass a portion of the air in said conduit means to the outside thereof.

3. In an internal combustion engine: a cylinder, a cylinder head connected to said cylinder and provided with an air intake conduit and also provided with a valve passage for conveying air from said air intake conduit through said valve passage into said cylinder, a control member for closing and opening said valve passage to control the admittance of air into said cylinder through said valve passage, said intake conduit being provided with a by-pass passage leading from the inside of said conduit to the outside thereof, and tubular means fitted into said by-pass passage and having its lower end extending near said valve passage thereby causing air near that portion of the closure member which closes and opens said valve passage to sweep over said portion prior to escaping from said conduit through said tubular means.

4. In an internal air cooled combustion engine: a cylinder provided with cooling fins, a cylinder head provided with cooling fins and connected to said cylinder, said cylinder head also being provided with air intake conduit means and with a valve passage for conveying air from said conduit means into said cylinder, control means for closing and opening said valve passage, and by-pass means extending from said conduit means near said valve passage to the outside of said conduit means between the cooling fins of said cylinder head.

5. In an internal combustion engine: a cylinder, a cylinder head connected to said cylinder and provided with air intake conduit means and with an air inlet valve passage for conveying air from said air intake conduit means into said cylinder, a water cooling jacket surrounding said cylinder and said cylinder head, a control member for closing and opening said valve passage to control the admittance of air from said air intake conduit means to said cylinder, and air by-pass passage means extending from said air intake conduit means near said valve passage through said cooling jacket to the outside thereof.

6. In a 2-stroke cycle internal combustion engine: a cylinder provided with an opening for admitting scavenging air, a piston reciprocably mounted in said cylinder for controlling said opening, conduit means arranged on the outside of said cylinder and leading to said opening for conveying scavenging air through said opening into said cylinder, and by-pass channel means leading from said conduit means near said opening toward the outside of said conduit means for by-passing scavenging air from said conduit means toward the outside thereof.

References Cited in the file of this patent

FOREIGN PATENTS 360,382  Great Britain _____ Apr. 28, 1930